(12) United States Patent
Al-Janabi

(10) Patent No.: US 12,372,384 B2
(45) Date of Patent: Jul. 29, 2025

(54) 360 DEGREE IN-LINE PIPE SENSOR ASSEMBLY

(71) Applicant: Saudi Arabian Oil Company, Dhahran (SA)

(72) Inventor: Yahya T. Al-Janabi, Al-Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 287 days.

(21) Appl. No.: 18/053,657

(22) Filed: Nov. 8, 2022

(65) Prior Publication Data

US 2024/0151562 A1    May 9, 2024

(51) Int. Cl.
*G01D 21/02* (2006.01)

(52) U.S. Cl.
CPC .................................. *G01D 21/02* (2013.01)

(58) Field of Classification Search
None
See application file for complete search history.

(56) References Cited

U.S. PATENT DOCUMENTS

| | | | |
|---|---|---|---|
| 4,338,097 A * | 7/1982 | Turner | G01N 17/00 422/53 |
| 4,452,087 A | 6/1984 | D'Antonio | |
| 5,303,592 A | 4/1994 | Livingston | |
| 7,253,742 B2 | 8/2007 | Davis et al. | |
| 7,448,281 B2 | 11/2008 | Baecker et al. | |
| 7,650,796 B2 | 1/2010 | Kappertz et al. | |
| 2011/0125424 A1 | 5/2011 | Han et al. | |
| 2013/0114777 A1 * | 5/2013 | Goszczynski | G21C 17/017 376/247 |

FOREIGN PATENT DOCUMENTS

| | | |
|---|---|---|
| CN | 100362341 C | 1/2008 |
| CN | 102495107 B | 9/2013 |
| CN | 103852487 B | 8/2016 |
| CN | 105973775 A | 9/2016 |

(Continued)

OTHER PUBLICATIONS

Lærke Skov Hansen, etal.; Multi-Phase Flow Metering in Offshore Oil and Gas Transportation Pipelines: Trends and Perspectives; https://www.researchgate.net/publication/333048519_Multi-Phase_Flow_Metering_in_Offshore_Oil_and_Gas_Transportation_Pipelines_Trends_and_Perspectives; May 2019; 26 pages.

(Continued)

*Primary Examiner* — John E Breene
*Assistant Examiner* — Nigel H Plumb
(74) *Attorney, Agent, or Firm* — Leason Ellis LLP

(57) ABSTRACT

A sensor, an assembly of the sensor with a pair of cylindrical pipes, and a method have dispose the sensor in-line with the pipes. The sensor has an annular electrode extending in a 360 degree range of detection of a first characteristic around a common longitudinal axis of the pair of pipes, which maximizes the range of detection of the first characteristic of the pipes. The annular electrode includes a conductor connecting the annular electrode to a measurement transmitter. The annular electrode detects the first characteristic and generates a first measurement signal corresponding to the first characteristic. The conductor conveys the first measurement signal to the measurement transmitter. The method implements the operation of the sensor.

20 Claims, 6 Drawing Sheets

(56) References Cited

FOREIGN PATENT DOCUMENTS

| EP | 2416127 | B1 | | 3/2015 | |
|---|---|---|---|---|---|
| GB | 2329023 | A | * | 3/1999 | ............ G01K 13/02 |
| WO | 2020165162 | A1 | | 8/2020 | |

OTHER PUBLICATIONS

Aidin Ghavamian, et al.; Detection, Localisation and Assessment of Defects in Pipes Using Guided Wave Techniques: A Review; https://www.mdpi.com/1424-8220/18/12/4470; Oct. 15, 2018; 48 pages.

Iliya Tizhe Thuku, et al.; Electric charge tomography imaging using finite-element method and Pro-rata distribution; https://www.researchgate.net/publication/261041323_Electric_charge_tomography_imaging_using_finite-element_method_and_Pro-rata_distribution; Jun. 2013, 7 pages.

International Search Report and Written Opinion in corresponding PCT Application No. PCT/US2023/078475 mailed Feb. 20, 2024; 8 pages.

* cited by examiner

360 DEGREE IN-LINE PIPE SENSOR ASSEMBLY

FIELD OF THE DISCLOSURE

The present disclosure relates generally to a sensor for a pipe, and, more particularly, to a sensor, an assembly, and a method which have the sensor in-line with the pipe and with a 360 degree range of detection.

BACKGROUND OF THE DISCLOSURE

Sensors are used in the oil and gas industry to detect various characteristics of pipes, such as corrosion, erosion, pressure, temperature, dew point, pH, hydrogen sulfide, dissolved oxygen, phase distribution, flow rate, velocity, wall shear stress, conductivity, and resistivity. Such sensors can be placed in a pipe by drilling a hole in a side of the pipe to receive the sensor. However, such sensors have a limited range of detection, such as 30 degrees around the hole. Accordingly, multiple sensors must be placed in multiple drill holes in the pipe, which weakens the structure of the pipe.

Other sensors can be placed inside of a pipe without drilling holes in the sides of the pipe. However, due to their limited range of detection of an individual sensor, multiple sensors must be placed in the pipe, which constricts the pipe and interferes with the passage of fluid or gas through the pipe.

SUMMARY OF THE DISCLOSURE

According to an embodiment consistent with the present disclosure, a sensor, an assembly, and a method have the sensor in-line with a pipe and with a 360 degree range of detection.

In an embodiment, an annular sensor comprises an annular electrode and a conductor. The annular electrode is configured to be positioned in-line between a pair of cylindrical pipes extending in a longitudinal direction along a common longitudinal axis. The conductor is configured to connect the annular electrode to a measurement transmitter. The annular electrode detects a first characteristic of the pair of cylindrical pipes and generates a first measurement signal corresponding to the first characteristic. The conductor conveys the first measurement signal to the measurement transmitter. The annular electrode has a range of detection of the first characteristic extending 360 degrees around the longitudinal axis.

The first characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity. The annular electrode is configured to be positioned between a pair of isolating washers, with each washer being positioned adjacent to a flange of a respective cylindrical pipe. The conductor can be a metallic tab extending from a periphery of the annular electrode. Alternatively, the conductor can be a metallic wire extending from a periphery of the annular electrode. The annular electrode has a shape selected from the group consisting of: a circular annulus, a square annulus, a triangular annulus, and a rectangular annulus.

The annular sensor further comprises an inner annulus and an inner sensor. The inner annulus is composed of a non-metallic material extending 360 degrees around an inner periphery of the annular electrode. The inner sensor is disposed in an inner periphery of the inner annulus. The inner sensor detects a second characteristic of the pair of cylindrical pipes and generates a second measurement signal corresponding to the second characteristic. The conductor connects the inner sensor to the measurement transmitter and conveys the second measurement signal to the measurement transmitter. The inner sensor is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array. The second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

In another embodiment, an assembly comprises a pair of cylindrical pipes, an annular sensor, and a conductor. The pair of cylindrical pipes extend in a longitudinal direction along a common longitudinal axis. The annular sensor includes an annular electrode and a conductor. The annular electrode is configured to be positioned in-line between the pair of cylindrical pipes. The conductor is configured to connect the annular electrode to a measurement transmitter. The annular electrode detects a first characteristic of the pair of cylindrical pipes and generates a first measurement signal corresponding to the first characteristic. The conductor conveys the first measurement signal to the measurement transmitter. The annular electrode has a range of detection of the first characteristic extending 360 degrees around the longitudinal axis.

The first characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity. The annular electrode is configured to be positioned between a pair of isolating washers, with each washer being positioned adjacent to a flange of a respective cylindrical pipe. The conductor can be a metallic tab extending from a periphery of the annular electrode. Alternatively, the conductor can be a metallic wire extending from a periphery of the annular electrode.

The annular sensor further comprises an inner annulus and an inner sensor. The inner annulus is composed of a non-metallic material extending 360 degrees around an inner periphery of the annular electrode. The inner sensor is disposed in an inner periphery of the inner annulus. The inner sensor detects a second characteristic of the pair of cylindrical pipes and generates a second measurement signal corresponding to the second characteristic. The conductor connects the inner sensor to the measurement transmitter and conveys the second measurement signal to the measurement transmitter. The inner sensor is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array. The second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

In a further embodiment, a method comprises the steps of providing an annular sensor including an annular electrode and a conductor connecting the annular electrode to a measurement transmitter, positioning the annular sensor in-line between a pair of cylindrical pipes extending in a longitudinal direction along a common longitudinal axis, detecting a characteristic of the pair of cylindrical pipes using the annular electrode, generating a measurement signal corresponding to the characteristic, and conveying the measurement signal to the measurement transmitter using the conductor. The annular electrode has a range of detection of the first characteristic extending 360 degrees around the longitudinal axis. The characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity. The method further comprises positioning a pair of washers between the pair of cylindrical pipes, wherein each washer is positioned adjacent to a flange of a respective cylindrical pipe, and positioning the annular sensor between the pair of washers.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a sensor 10, an assembly 100, and a method 200 which have the sensor 10 in-line with a pipe and with a 360 degree range of detection.

Figure 5:
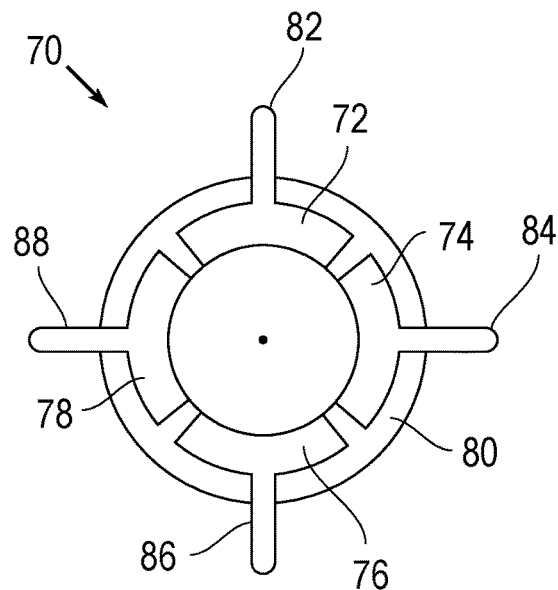
FIG. 5 is a side elevational view of an assembly of sensors and washers with parts separated.
Figure 6:
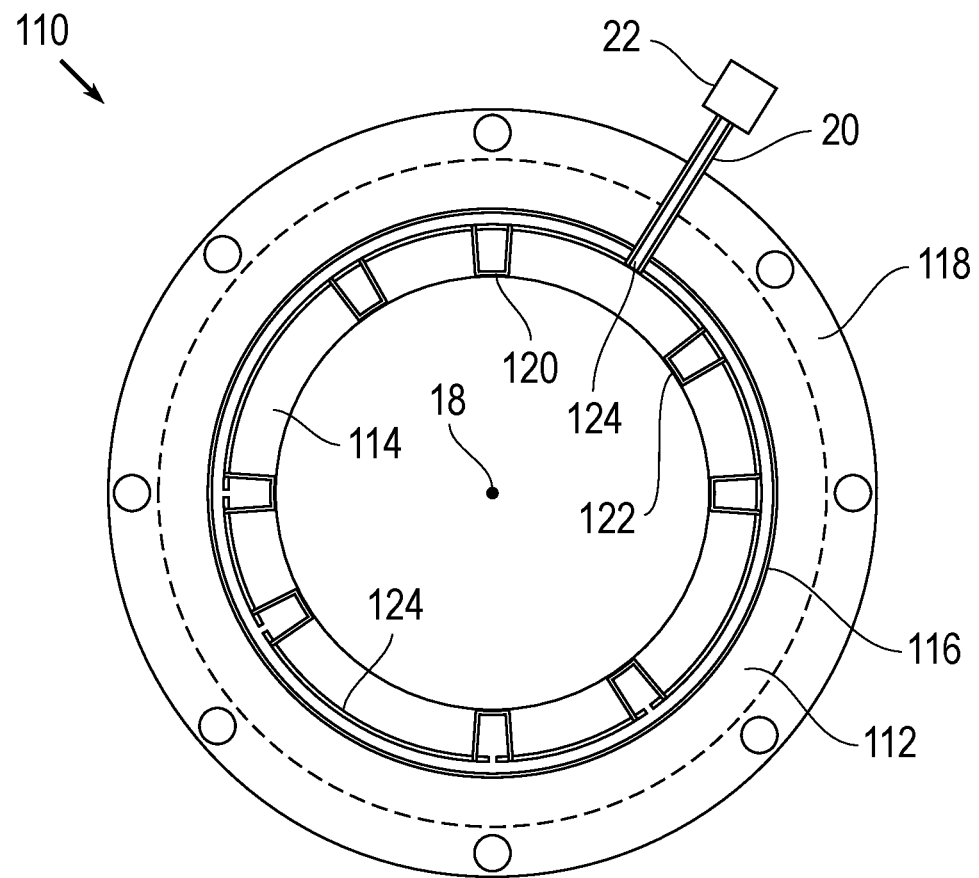
FIG. 6 is a front elevational view of an alternative embodiment of the sensor having embedded sensor elements.
Figure 7:
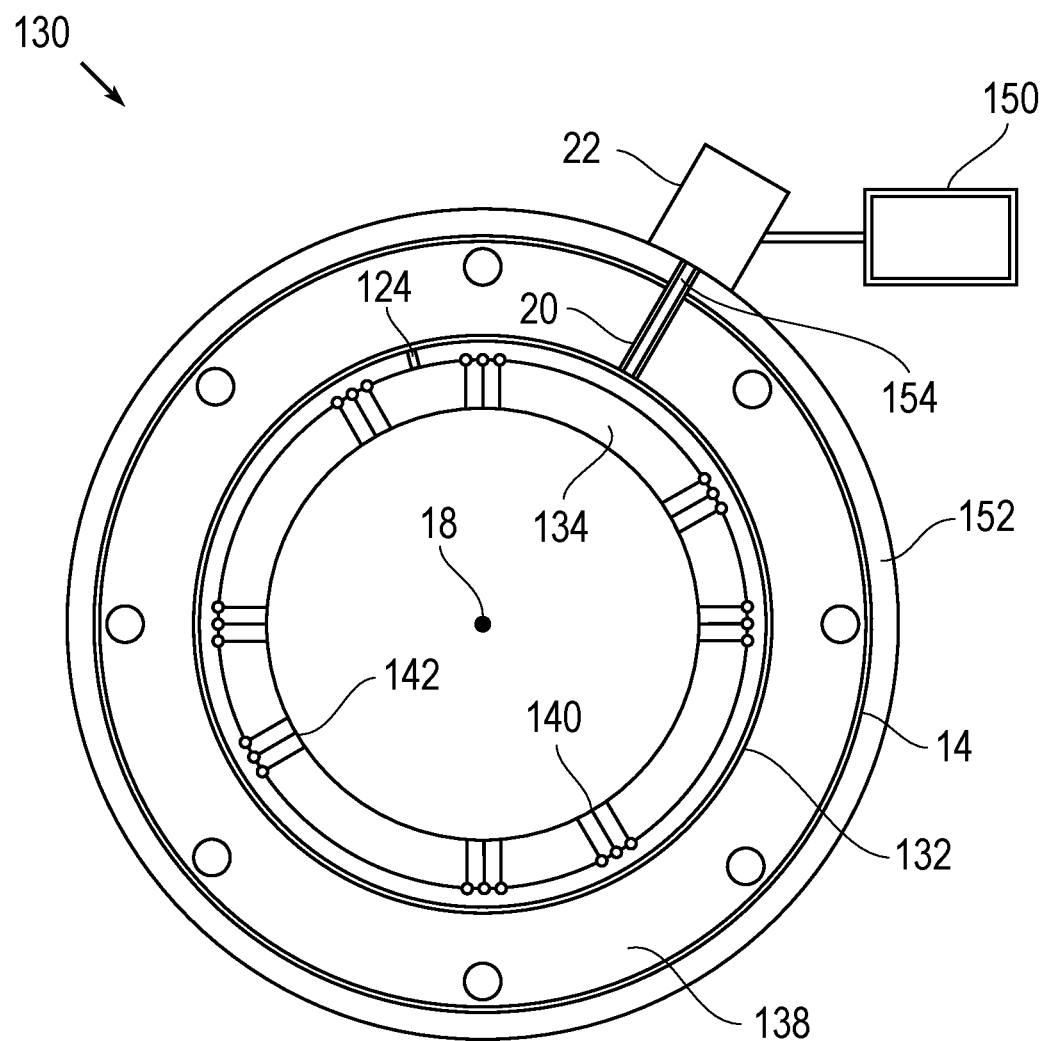
FIG. 7 is a front elevational view of another alternative embodiment of the sensor having embedded sensor elements and connected to a display.

As shown in FIGS. 1-7, the sensor 10 has an annular shape with an annular electrode 12 configured to be positioned in-line between a pair of cylindrical pipes 14, 16 extending in a longitudinal direction along a common longitudinal axis 18. A conductor 20 connects the annular electrode 12 to a measurement transmitter 22, as shown in FIGS. 6-7. The conductor 20 can be a metallic tab extending from a periphery 24 of the annular electrode 12. Alternatively, the conductor 20 can be a metallic wire extending from the periphery 24 of the annular electrode 12.

The annular electrode 12 detects a first characteristic of the pair of cylindrical pipes 14, 16 and generates a first measurement signal corresponding to the first characteristic. The first characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity. Such service conditions are detected under low or high pressure, low or high temperature, or highly aggressive and corrosive environments for all types of pipeline materials. The conductor 20 conveys the first measurement signal to the measurement transmitter 22. The measurement transmitter 22 can transmit the first measurement signal by wire or wirelessly to a display or to a processor.

Figure 1:
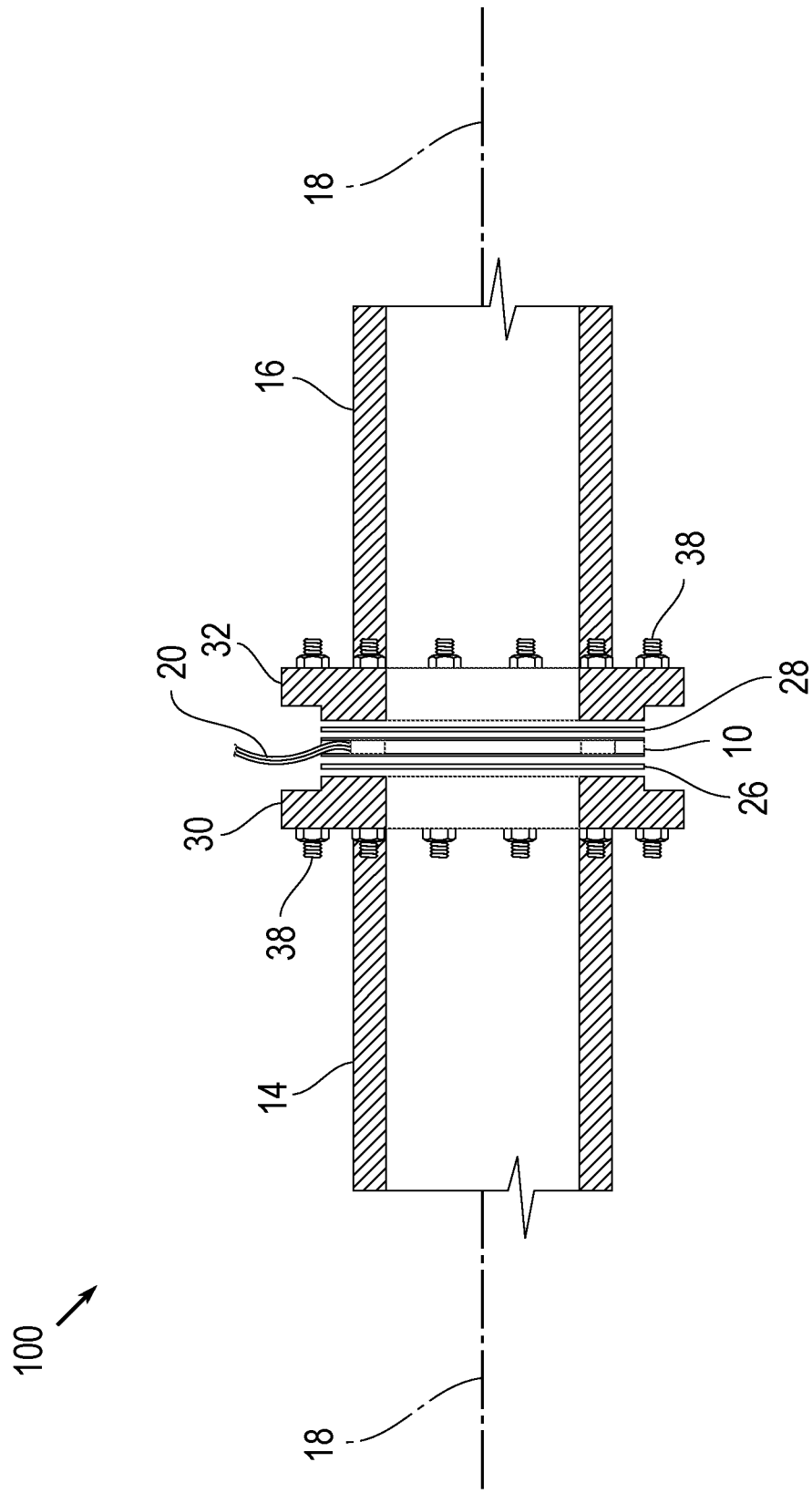
FIG. 1 is a cross-sectional view of a pair of pipes having an in-line sensor therebetween according to an embodiment.
Figure 2:
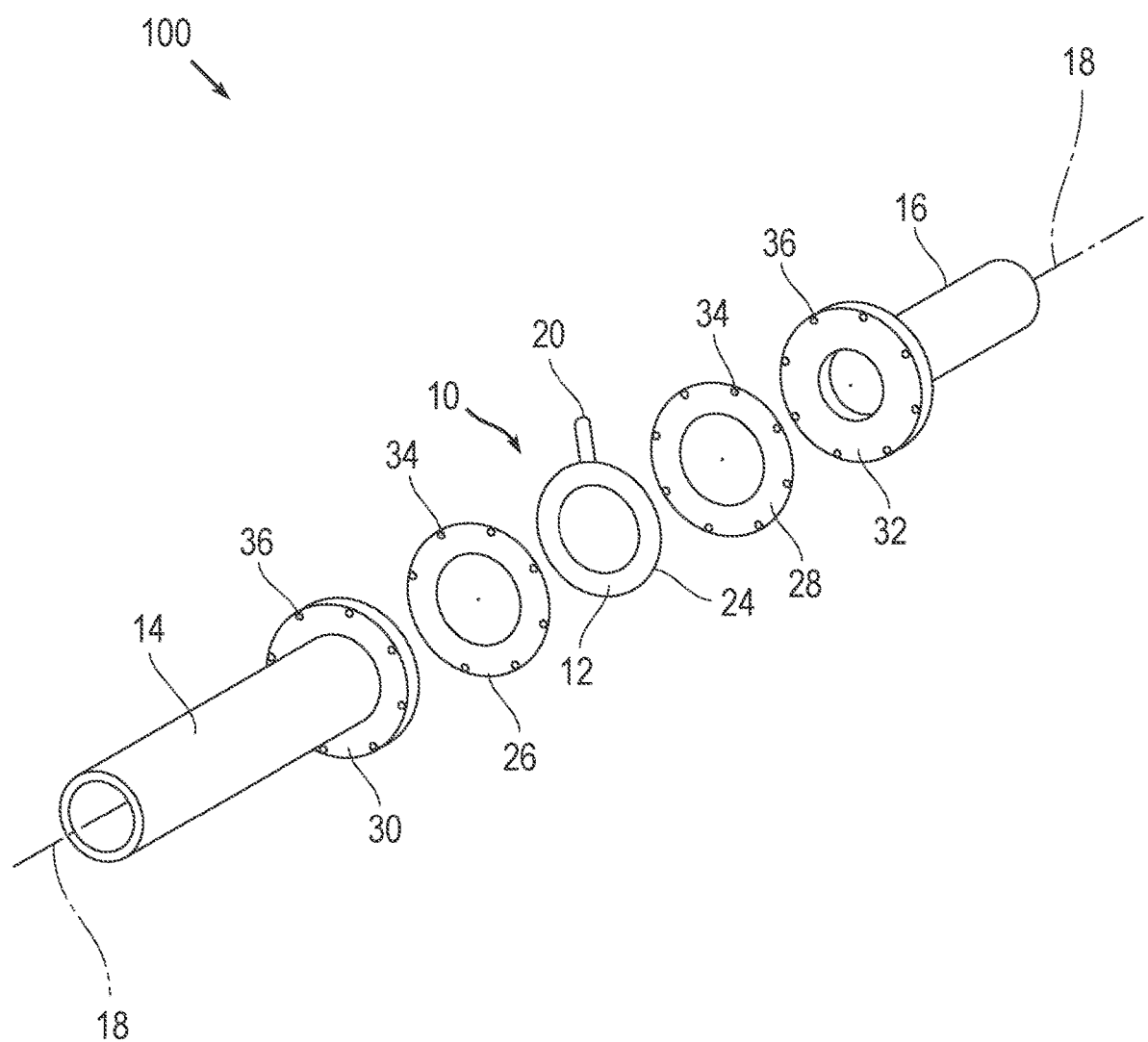
FIG. 2 is a top front right perspective view of the pipes and the sensor of FIG. 1 with parts separated.

The annular electrode 12 is in-line with the pair of pipes 14, 16, and has a range of detection of the first characteristic extending 360 degrees around the longitudinal axis 18. In one embodiment, the annular electrode 12 is configured to be positioned between a pair of isolating washers 26, 28, with each washer 26, 28 being positioned adjacent to a respective flange 30, 32 of a respective cylindrical pipe 14, 16, as shown in FIGS. 1-2. The pipes 14, 16 and respective flanges 30, 32 can be composed of metallic materials. Alternatively, at least one of the pipes 14, 16 and at least one of the flanges 30, 32 can be composed of non-metallic materials, such as plastic, ceramics, glass, high-performance polytetrafluoroethylene (PTFE), or other known non-metallic materials. The isolating washers 26, 28 can be composed of a non-electrical-conducting material, such as non-electrical-conducting plastic, ceramics, glass, high-performance polytetrafluoroethylene (PTFE), or other known non-electrical-conducting materials. The washers 26, 28 can have apertures 34 aligned with apertures 36 in the flanges 30, 32 configured to receive fasteners 38 to removably secure the flanges 30, 32 of the pipes 14, 16 together, with the washers 26, 28 secured therebetween. The annular sensor 10 and its annular electrode 12 are held in place between the washers 26, 28. Alternatively, the annular electrode 12 can have corresponding aligning apertures to match the apertures of the flanges 30, 32, and configured to receive the fasteners 38. Accordingly, the fasteners 38 can be composed of non-electrical-conducting materials so that the annular electrode 12 and the conductor 20 are electrically isolated from the pipes 14, 16, which can be composed of metallic materials.

The pipes 14, 16 can be cylindrical. For example, each pipe 14, 16 can have a circular cross-section perpendicular to the longitudinal axis 18. Accordingly, the annular electrode 12 and the washers 26, 28 can have the shape of a circular annulus. Alternatively, each pipe 14, 16 can have a non-circular cross-section, such as a square, a triangle, or a rectangle. Accordingly, the annular electrode 12 and the washers 26, 28 can have shapes matching the non-circular cross-section of the pipes 14, 16. For example, the annular electrode 12 and the washers 26, 28 can have a non-circular shape, such as the shape of a square annulus, a triangular annulus, and a rectangular annulus.

Figure 3:
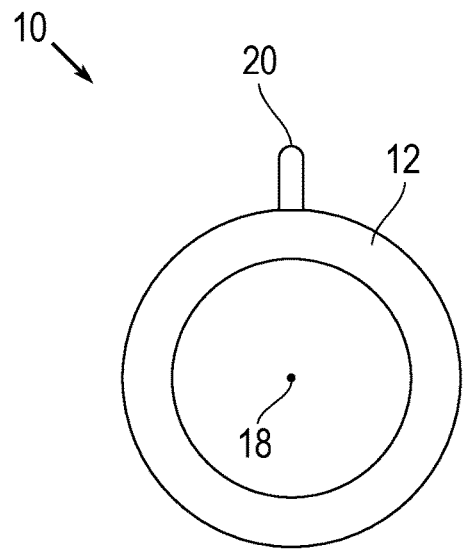
FIG. 3 is a front elevational view of the sensor of FIG. 1.

FIG. 3 illustrates a single annular sensor 10 having the annular electrode 12 and the conductor 20 extending from the annular electrode 12. In an alternative embodiment shown in FIG. 4, a multi-electrode sensor 40 can be composed of a plurality of annular electrodes 42, 44, 46 having respective conductors 48, 50, 52 extending therefrom. The conductors 48, 50, 52 can be rotated about the longitudinal axis 18 relative to each other to facilitate connections of the conductors 48, 50, 52 to respective external components. A plurality of isolating washers 54, 56, 58, 60 allow the conductors 48, 50, 52 to be electrically isolated from each other and from the pipes 14, 16. The multi-electrode sensor 40 permits the independent studying of the different regions inside the pipeline. The electrodes 48, 50, 52 can be composed of the same material as the pipes 14, 16.

Figure 4:
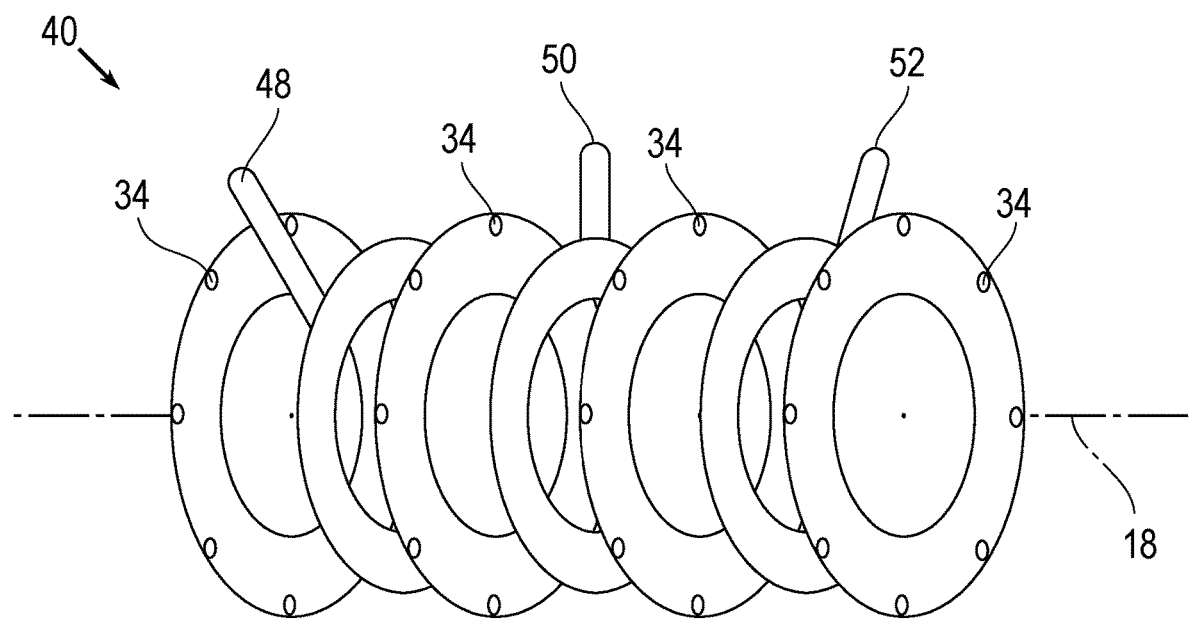
FIG. 4 is an alternative embodiment of an assembly of the sensors of FIG. 1.

In the example embodiment shown in FIG. 4, electrochemical measurements can be performed using the three-electrode arrangement, with one electrode 48 performing as working electrode, a second electrode 50 performing as a reference electrode, and a third electrode 52 performing as a counter electrode. The reference electrode 50 and the counter electrode 52 can be made of materials different from the materials constituting the pipes 14, 16. Moreover, the electrodes 48, 50, 52 can be composed of different materials for evaluation and comparison purposes.

Referring to FIG. 5, an alternative embodiment of the annular sensor 70 has a plurality of electrodes 72, 74, 76, 78 retained by an outer annulus 80 and extending 360 degrees around the longitudinal axis 18. Each electrode 72, 74, 76, 78 has a respective conductor 82, 84, 86, extending therefrom. The outer annulus 80 can be composed of non-metallic material to isolate the electrodes 72, 74, 76, 78 from each other and from the pipes 14, 16.

In an alternative embodiment, shown in FIG. 6, the annular sensor 110 has an outer annular electrode 112 and an inner annulus 114 composed of a non-metallic material extending 360 degrees around an inner periphery 116 of the outer annular electrode 112. The outer annular electrode 112 and the inner annulus 114 are disposed adjacent to an isolating washer 118 to isolate the electrode 112 and annulus 114 from the pipes 14, 16 as described above. At least one inner sensor 120, 122 is disposed in an inner periphery 124 of the inner annulus 114. The at least one inner sensor 120, 122 is positioned around the longitudinal axis 18 and in-line with the pathway of the pipes 14, 16. For example, a plurality of inner sensors 120, 122 can be employed. The inner sensors 120, 122 can be positioned at a 12 o'clock and 2 o'clock position around the longitudinal axis 18. A peripheral conductor 124 electrically connects the at least one inner sensor 120, 122 with the conductor 20.

The at least one inner sensor 120, 122 detects a second characteristic of the pair of cylindrical pipes 14, 16 and generates a second measurement signal corresponding to the second characteristic. The peripheral conductor 124 and the conductor 20 connect the at least one inner sensor 120, 122 to the measurement transmitter 22, and convey the second measurement signal to the measurement transmitter 22. The at least one inner sensor 120, 122 is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array. In the example embodiment shown in FIG. 6, the at least one sensor 120, 122 is an electrical filament. As such filaments corrode or erode, their electrical resistance increases. By measuring change in electrical resistance, the corresponding corrosion or erosion rates can be calculated. Other types of sensors can be used. For example, each of an electrochemical noise sensor and a coupled multielectrode array can measure the pitting tendency of a corrosive media.

Alternatively, the sensors 120, 122 can be different types of known sensors, such that diverse sensors described herein can measure different characteristics of the pipes 14, 16. The second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity. Alternatively, the sensors 120, 122 can detect characteristics for use in metal ion analysis, residual inhibitor determination, chemical analysis of process samples, and microbiological analysis.

In another alternative embodiment, shown in FIG. 7, the annular sensor 130 has an outer annular electrode 132 and an inner annulus 134 composed of a non-metallic material extending 360 degrees around an inner periphery 136 of the outer annular electrode 132. The outer annular electrode 132 and the inner annulus 134 are disposed adjacent to an isolating washer 138 to isolate the electrode 132 and annulus 134 from the pipes 14, 16 as described above. At least one inner sensor 140, 142 is disposed in an inner periphery 144 of the inner annulus 134. The at least one inner sensor 140, 142 is positioned around the longitudinal axis 18 and in-line with the pathway of the pipes 14, 16. For example, a plurality of inner sensors 140, 142 can be employed. The inner sensors 140, 142 can be positioned at a 5 o'clock and 8 o'clock position around the longitudinal axis 18. A peripheral conductor 124 electrically connects the at least one inner sensor 140, 142 with the conductor 20.

The at least one inner sensor 140, 142 detects a second characteristic of the pair of cylindrical pipes 14, 16 and generates a second measurement signal corresponding to the second characteristic. The peripheral conductor 124 and the conductor 20 connect the at least one inner sensor 140, 142 to the measurement transmitter 22, and convey the second measurement signal to the measurement transmitter 22. The measurement transmitter 22 can transmit the first or second measurement signal by wire or wirelessly to a display or to a processor.

The at least one inner sensor 140, 142 is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array. In the example embodiment shown in FIG. 7, the at least one sensor 140, 142 is a linear polarization resistance electrode, which can measure general corrosion rates, Linear polarization resistance (LPR) is most commonly run in a three electrode mode. In this configuration, there is a working electrode (WE), a counter electrode (CE), and a reference electrode (RE). LPR is a quick, non-destructive testing technique commonly used in corrosion studies to measure corrosion rates. In this method, the WE is polarized, typically on the order of ±10 mV, relative to its Open Circuit (OC) potential. As the potential of the WE is varied, a current is induced to flow between the working and counter electrodes, and the resistance to polarization (Rp), can be found by taking the slop of the potential-versus-current curve. This resistance can then be used to find the corrosion rate using the known Stern-Geary equation. Alternatively, the sensors 140, 142 can be different types of sensors. The second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

In the alternative embodiment shown in FIG. 7, a display 150 can be connected to the measurement transmitter 22 and configured to display sensor data corresponding to the first or second measurement signals regarding the first or second characteristics, respectively, of the pipes 14, 16. The display 150 can be a liquid crystal display (LCD), an organic light-emitting diode (OLED) display, or any known display device. The display 150 can be an integrated touch screen for control and display of the first or second measurement signals. For example, a graphic representation of the pipes 14, 16 can be displayed on the display 150 with different colors representing the state of the pipes 14, 16 at different sections of the pipes 14, 16. In one embodiment, red pixels can be displayed on a representation of portions of the pipes 14, 16, displayed on the display 150. Such red pixels can represent corrosion to provide graphical information of the corrosion to a user of the display 150.

In another alternative embodiment shown in FIG. 7, at least one of the pipes 14, 16 can be covered with a display 152 connected to the conductor 20 at a connection 154. The display 152 can be a liquid crystal display (LC), an organic light-emitting diode (OLED) display, or any known display device. The display 152 can be an integrated touch screen for control and display of the first or second measurement signals. For example, a graphic representation of the pipes 14, 16 can be displayed on the display 152 with different colors representing the state of the pipes 14, 16 at different sections of the pipes 14, 16 corresponding to the location of the displayed colors. In one embodiment, red pixels can be displayed on portions of the pipes 14, 16 to represent corrosion, and so to provide graphical information of the corrosion to a user of the display 152.

As would be appreciated by those of skill in the art, the electrodes and the corresponding conductors in each of the embodiments described herein are part of an electrical circuit which obtains signals from the electrodes and provides the signals to a display or to a hardware processor for processing into further signals concerning the measurements being performed. The cell or electrical circuit consists of the electrodes, the medium, and the conductors. The electrical circuit typically includes a potentiostat which has the function of controlling the voltage difference and measuring the current flow. A miniaturized potentiostat is integrated into the system and is used to conduct these measurements. In the cases of electrical resistance and LPR measurements, the controlled variable is the potential (E) and the measured variable is the current (I). A typical potentiostat consists of an electrometer, a current-to-voltage (I/E) converter, and a control amplifier. The electrometer circuit measures the voltage difference between the reference and working electrodes. The output of the electrometer circuit is the cell voltage and is used as the feedback signal in the potentiostat circuit. The I/E converter measures the cell current by measuring the voltage drop across a resistor. The control amplifier is a servo amplifier that compares the measured cell voltage with the set voltage and drives current into the cell so that the two voltages are the same. Analog-to-digital (A/D) converters can also be used for digitization.

Figure 8:
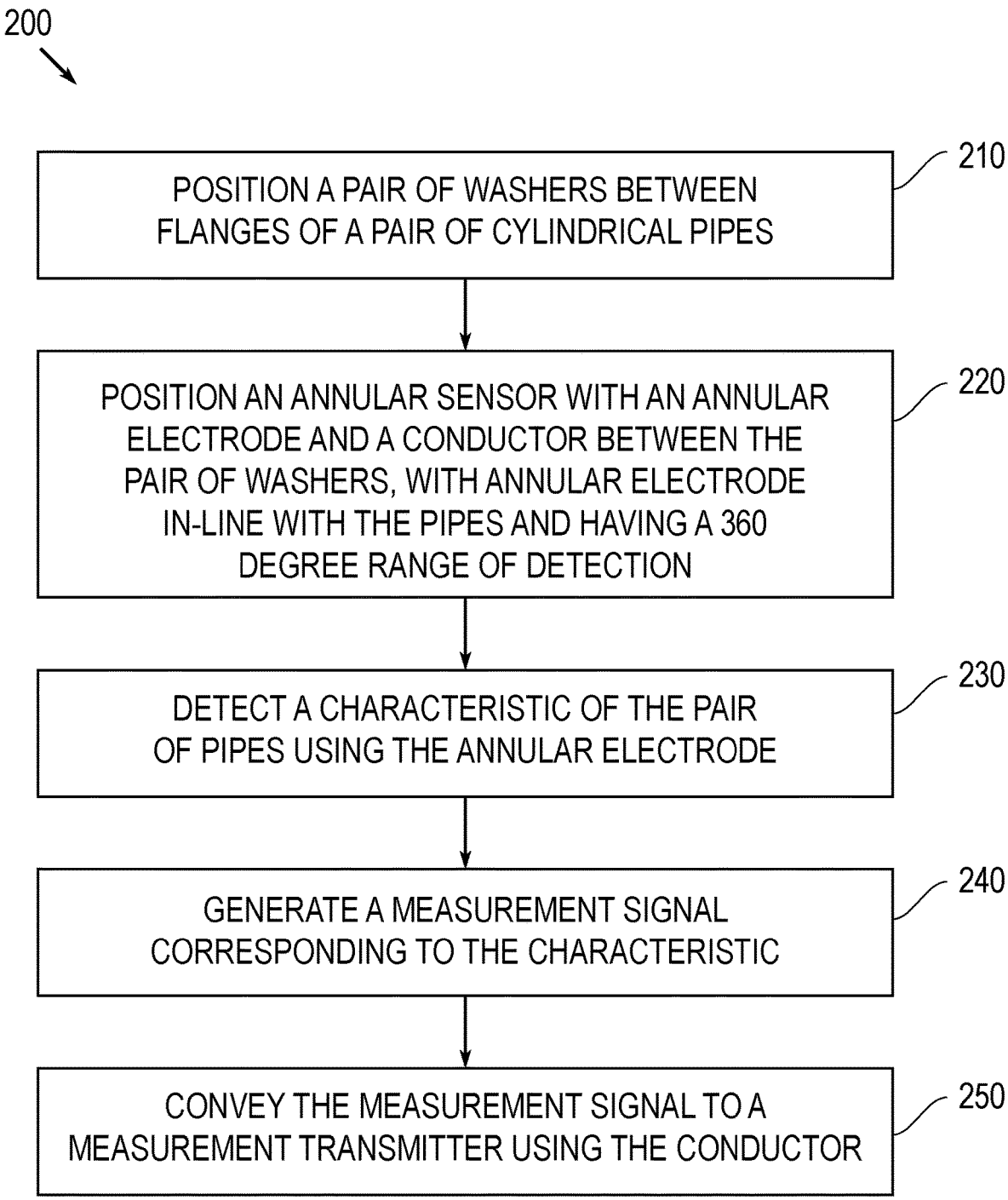
FIG. 8 is a flowchart of a method of operation of the sensor of FIG. 1.

FIG. 8 is a flowchart of a method 200 of operation of the annular sensors described herein. Referring to the example embodiment shown in FIGS. 1-3, the method 200 includes positioning a pair of washers 26, 28 between flanges 30, 32 of a pair of cylindrical pipes 14, 16 in step 210. The method 200 then positions an annular sensor 10 between the pair of washers 26, 28 in step 220, with the annular sensor 10 including an annular electrode 12 and a conductor 20. The annular sensor 10 is in-line between the pair of cylindrical pipes 14, 16 extending in a longitudinal direction along a common longitudinal axis 18. The annular electrode 12 has a range of detection of a characteristic of the pipes 14, 16 with the range extending 360 degrees around the longitudinal axis 18. The characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

The method 200 then detects the characteristic of the pair of cylindrical pipes 14, 16 in step 230 using the annular electrode 12. The annular electrode 12 generates a measurement signal corresponding to the characteristic in step 240, and the conductor 20 conveys the measurement signal to a measurement transmitter 22 in step 250.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An annular sensor, comprising:
an annular electrode having the shape of an annulus and configured to be positioned in-line between a pair of cylindrical pipes with the pair of cylindrical pipes extending in a longitudinal direction along a common longitudinal axis, wherein the annular electrode extends circumferentially around the entire 360 degree circumferential extent of the pair of cylindrical pipes about the common longitudinal axis; and
a conductor electrically connecting the annular electrode to a measurement transmitter,
wherein the annular electrode detects a first characteristic of the pair of cylindrical pipes and generates a first measurement signal corresponding to the first characteristic,
wherein the conductor conveys the first measurement signal to the measurement transmitter, and
wherein the annular electrode has a range of detection of the first characteristic extending 360 degrees around the common longitudinal axis.

2. The annular sensor of claim 1, wherein the first characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

3. The annular sensor of claim 1, wherein the annular electrode is configured to be positioned between a pair of isolating washers, each washer being positioned adjacent to a flange of a respective cylindrical pipe.

4. The annular sensor of claim 1, wherein the conductor is a metallic tab extending from a periphery of the annular electrode.

5. The annular sensor of claim 1, wherein the conductor is a metallic wire extending from a periphery of the annular electrode.

6. The annular sensor of claim 1, wherein the annular electrode has a shape selected from the group consisting of: a circular annulus, a square annulus, a triangular annulus, and a rectangular annulus.

7. The annular sensor of claim 1, further comprising:
an inner annulus composed of a non-metallic material extending 360 degrees around an inner periphery of the annular electrode; and
an inner sensor disposed in an inner periphery of the inner annulus,
wherein the inner sensor detects a second characteristic of the pair of cylindrical pipes and generates a second measurement signal corresponding to the second characteristic, and
wherein the conductor connects the inner sensor to the measurement transmitter and conveys the second measurement signal to the measurement transmitter.

8. The annular sensor of claim 7, wherein the inner sensor is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array.

9. The annular sensor of claim 7, wherein the second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

10. An assembly, comprising:
a pair of cylindrical pipes extending in a longitudinal direction along a common longitudinal axis;
an annular sensor including an annular electrode having the shape of an annulus and configured to be positioned in-line between the pair of cylindrical pipes, wherein the annular electrode extends circumferentially around the entire 360 degree circumferential extent of the pair of cylindrical pipes about a common longitudinal axis of the pair of cylindrical pipes; and
a conductor connecting the annular electrode to a measurement transmitter,
wherein the annular electrode detects a first characteristic of the pair of cylindrical pipes and generates a first measurement signal corresponding to the first characteristic,
wherein the conductor conveys the first measurement signal to the measurement transmitter, and
wherein the annular electrode has a range of detection of the first characteristic extending 360 degrees around the common longitudinal axis.

11. The assembly of claim 10, wherein the first characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

12. The assembly of claim 10, wherein the annular electrode is configured to be positioned between a pair of isolating washers, each washer being positioned adjacent to a flange of a respective cylindrical pipe.

13. The assembly of claim 10, wherein the conductor is a metallic tab extending from a periphery of the annular electrode.

14. The assembly of claim 10, wherein the conductor is a metallic wire extending from a periphery of the annular electrode.

15. The assembly of claim 10, wherein the annular sensor further comprises:
an inner annulus composed of a non-metallic material extending 360 degrees around an inner periphery of the annular electrode; and
an inner sensor disposed in an inner periphery of the inner annulus,
wherein the inner sensor detects a second characteristic of the pair of cylindrical pipes and generates a second measurement signal corresponding to the second characteristic, and
wherein the conductor connects the inner sensor to the measurement transmitter and conveys the second measurement signal to the measurement transmitter.

16. The assembly of claim 15, wherein the inner sensor is selected from the group consisting of: a linear polarization resistance electrode, an electrochemical noise sensor, an electrical impedance sensor, an electrical resistance sensor, an electrical filament, an environmental sensor, a multi-electrode array, and a microelectrode array.

17. The assembly of claim 15, wherein the second characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

18. A method, comprising:
providing an annular sensor including an annular electrode having the shape of an annulus, and a conductor connecting the annular electrode to a measurement transmitter;
positioning the annular sensor in-line between a pair of cylindrical pipes extending in a longitudinal direction along a common longitudinal axis, wherein the annular electrode extends circumferentially around the entire 360 degree circumferential extent of the pair of cylindrical pipes about the common longitudinal axis;
detecting, using the annular electrode, a characteristic of the pair of cylindrical pipes;
generating a measurement signal corresponding to the characteristic; and
conveying, using the conductor, the measurement signal to the measurement transmitter,
wherein the annular electrode has a range of detection of the first characteristic extending 360 degrees around the common longitudinal axis.

19. The method of claim 18, wherein the characteristic is selected from the group consisting of: corrosion, erosion, pressure, temperature, dew point, pH, hydrogen sulfide, dissolved oxygen, phase distribution, flow rate, velocity, wall shear stress, conductivity, and resistivity.

20. The method of claim 18, further comprising:
positioning a pair of washers between the pair of cylindrical pipes, wherein each washer is positioned adjacent to a flange of a respective cylindrical pipe; and
positioning the annular sensor between the pair of washers.

* * * * *